April 10, 1928.  1,665,229
G. A. TAYLOR
PISTON
Filed June 17, 1922   3 Sheets-Sheet 2

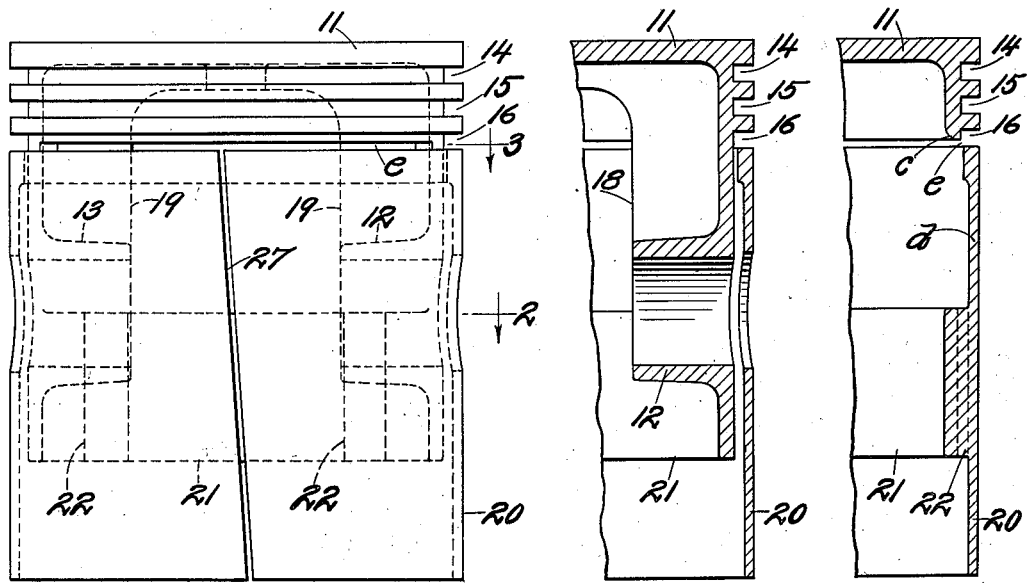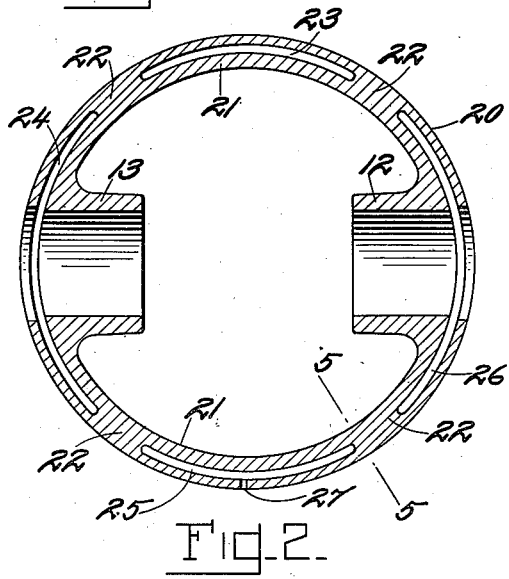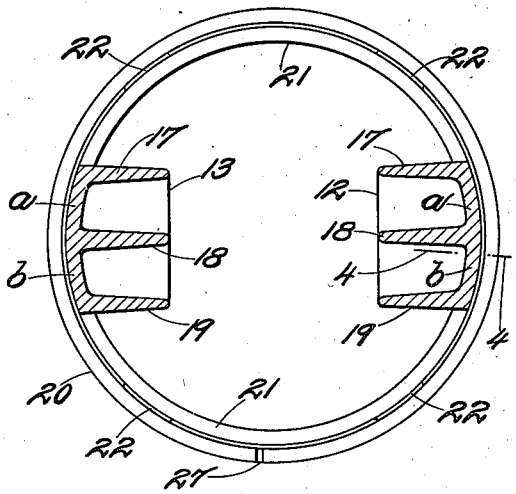

INVENTOR:
George A. Taylor,
by Macleod, Calver, Copeland & Dike
Attys

April 10, 1928.    G. A. TAYLOR    1,665,229

PISTON

Filed June 17, 1922    3 Sheets-Sheet 3

INVENTOR
George A. Taylor
by Macleod, Calver, Copeland
Attys.

Patented Apr. 10, 1928.

1,665,229

UNITED STATES PATENT OFFICE.

GEORGE A. TAYLOR, OF BOSTON, MASSACHUSETTS.

PISTON.

Application filed June 17, 1922. Serial No. 569,104.

My invention has for its object a new and improved piston for internal combustion engines or the like which shall be elastic and compressible and sufficiently yielding so that when unconfined it is slightly larger than the cylinder with which it is to be used. The piston embodying my invention is adapted to be made from cast iron or aluminum alloy and to be formed by well-known casting methods, being slotted and machined after the casting has been made. The piston embodying my invention has the advantage that as it and the cylinder in which it is used wear, it will take the form of the cylinder even though considerable deformation of the cylinder may occur for any reason, whether from wear or unequal expansion. I find in practice that the piston embodying my invention, even when made slightly larger than the cylinder in which it is to be used, will run dry or substantially dry, that is, without ordinary lubrication, for a considerable length of time without seizing.

The piston embodying my invention, while capable of advantageous use in new motors, is particularly adapted to use as a replacement in worn motors since it promptly assumes the shape of an out-of-round cylinder and tends to make a better fit with the cylinder wall as it wears. The piston embodying my invention is also so constructed as to reduce the machining expense somewhat and at the same time provides better drainage of the oil away from the cylinder walls and consequently is less likely to pump oil and foul the spark plugs or carbonize.

I attain the foregoing results by making at least a portion of the skirt of the piston independent of the head and of the piston pin bearings so that the skirt will be compressible circumferentially and at least one portion of it will be yieldable independently of the head. The independent portion of the skirt is supported by a rib member which lies closely adjacent with the interior peripheral surface of the skirt, which rib member may be horizontal and concentric or parallel with the skirt, or vertical and parallel with the skirt and the main axis of the piston. This rib member is somewhat flexible as well as the skirt and therefore contributes to the ability of the piston to adapt itself to variations or irregularities in shape of the cylinder. A portion of the skirt only or the entire skirt may be separated from the head and suspended by the rib members according to the particular conditions under which the piston is to be used and, therefore, I have used the phrase "portion of the skirt" to designate the skirt area supported by the rib members whether that area includes only a part of one side of the skirt or the whole skirt.

The invention will be fully understood from the following description when taken in connection with the accompanying drawings, and the novel features thereof will be pointed out and clearly defined in the claims at the close of this specification.

In the drawings, Fig. 1 is a side elevation of the piston embodying my invention in its preferred form, this form being provided with an independent skirt portion supported by rib members, the entire skirt being compressible and independent of the head and piston pin bearings, and the rib member being horizontal and concentric with the skirt.

Fig. 2 is a section on line 2 of Figure 1.
Fig. 3 is a section on line 3 of Figure 1.
Fig. 4 is a section on line 4, 4 of Figure 3.
Fig. 5 is a section on line 5, 5 of Figure 2.
Fig. 6 shows a piston embodying my invention in modified form, only a portion of one side of the skirt being independent of the head and piston pin bearings, and the rib members supporting this portion being arranged in a vertical position parallel to the skirt and to the axis of the piston.

Figure 6:
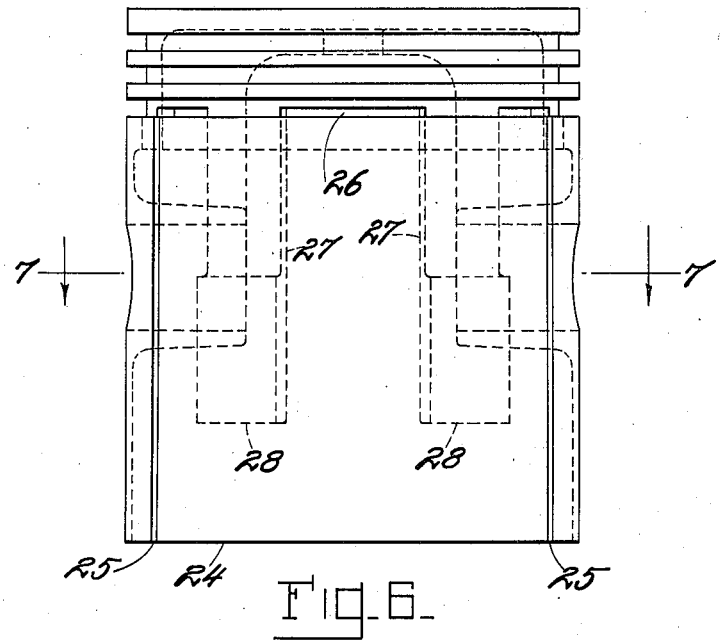

Referring now to the drawings and particularly to Figures 1 to 5 which show the preferred embodiment of my invention, the head is designated 11, the piston pin bearings 12 and 13 respectively and the piston ring grooves 14, 15 and 16 respectively. Inside the piston and extending from the head down to the piston pin bearings 12 and 13 are three ribs 17, 18 and 19 for each bearing. These ribs connect integrally the piston pin bearings and the head so that the piston pin bearings may be said to be supported from the head. The entire skirt 20 of the piston is separate from the head and from the piston pin bearings extending up to the lower piston ring groove 16 and is connected with the other parts in the following manner. There is a ring-shaped member 21 concentric with the interior of the skirt 20 extending between and connecting the two piston pin bearings on opposite sides of the piston. This rib is integrally connected to the skirt at four points designated 22 and is elsewhere separated from the ring by the spaces 23, 24, 25 and 26. It will be seen that the portion of the skirt 20 which is adjacent the piston pin bearings 12 and 13 is separated therefrom by spaces 24 and 26. The skirt is preferably slotted on one side, as shown at 27, to permit it to yield and be compressed. While I have shown only one slot, it will be understood that I do not limit myself to this construction, since to some extent the compressibility of the piston may be made to depend upon the number and arrangement of the slot or slots employed.

From the foregoing it will be seen that the skirt is supported from the ring or rib member 21 which is carried by the piston pin bearings and that they are themselves supported from the head by the ribs 17, 18 and 19 and intermediate portions of the wall $a$ and $b$. By making the diameter of the skirt in its normal or uncompressed condition slightly greater than the diameter of the head at the top or adjacent the ring grooves, a piston is provided which can be used in a cylinder slightly smaller than the normal diameter of the skirt. The skirt and the ring or rib member 21 which is substantially concentric with the interior of the skirt both contribute to the elasticity of the piston as a whole, and the skirt in effect constitutes a large spring piston ring at the bottom of the piston.

It will be seen that the interior of the head, except where the ribs 17, 18 and 19 join with the peripheral wall, is thinner at the point $c$ (see Fig. 5) which is in the middle of the lowest ring groove 16, and below that point there is only the thickness of the skirt, as is indicated at $d$. It will be understood that the piston is cast without the ring grooves, and that the ring grooves are subsequently cut by a lathe or milling machine. When the lowest groove 16 is cut, the tool breaks through the casting leaving a slot $e$ on the inside of the groove 16. This slot $e$ is only part of the width of the groove 16, so that an ample backing for the ring remains. This slot in the back of the lowest ring groove permits the oil which is removed by the piston ring in this groove, particularly if an oil scraping ring is employed, to pass into the interior of the piston and thus back to the crank case of the engine, thereby minimizing the tendency of the oil to work up into the cylinder above the piston. This construction saves one or two operations in the manufacture of the piston, since the cutting of a slot or slots to give the skirt the necessary freedom of movement relative to the head is obviated by the use of the lowest ring groove for this purpose.

My preferred form of piston already described is particularly intended for use when it is desired to employ die-casting methods in its manufacture. It will be understood, of course, that in this embodiment of my invention, all of the parts are cast integral and then the piston ring grooves 14, 15 and 16 and the slot 27 in the skirt are cut, leaving the skirt supported only by the rib or ring 21 which is in turn supported by the piston pin bearings.

Figure 7:
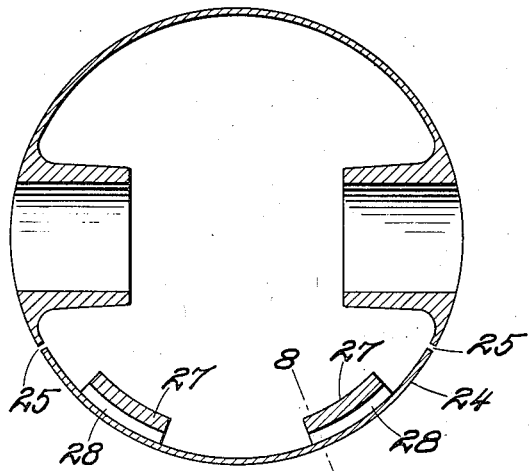
Fig. 7 is a horizontal section on line 7, 7, Figure 6.
Figure 8:
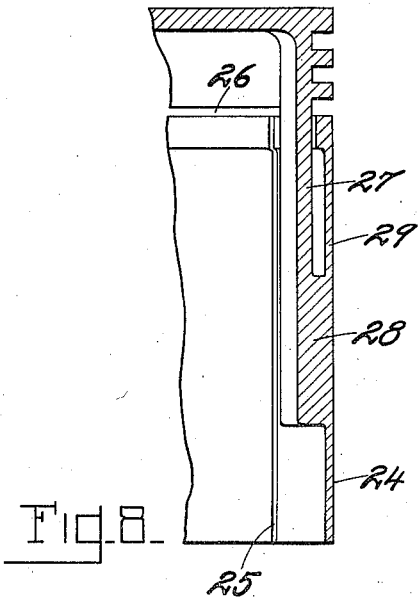
Fig. 8 is a vertical section on line 8, 8, Figure 7.

Referring now to Figures 6, 7 and 8, there is shown therein a piston embodying my invention in a modified form. In this type of piston, the head and one side are of the ordinary construction, and on the other side is an independent skirt portion 24 totally separated on its peripheral surface from the remainder of the piston by the vertical slots 25, 25, and the horizontal slot 26 at the back of the lowest piston ring groove. The detached portion of the skirt is supported from the head by two vertical ribs 27 extending downwardly and connected to the skirt portion at points 28 about midway of the height of the independent portion of the skirt. These rib members 27 are vertical and lie parallel with the adjacent portion of the peripheral surface of the skirt and are separated therefrom by spaces 29. This type of piston is particularly adapted for use where it is desired to employ sand castings.

Figure 9:
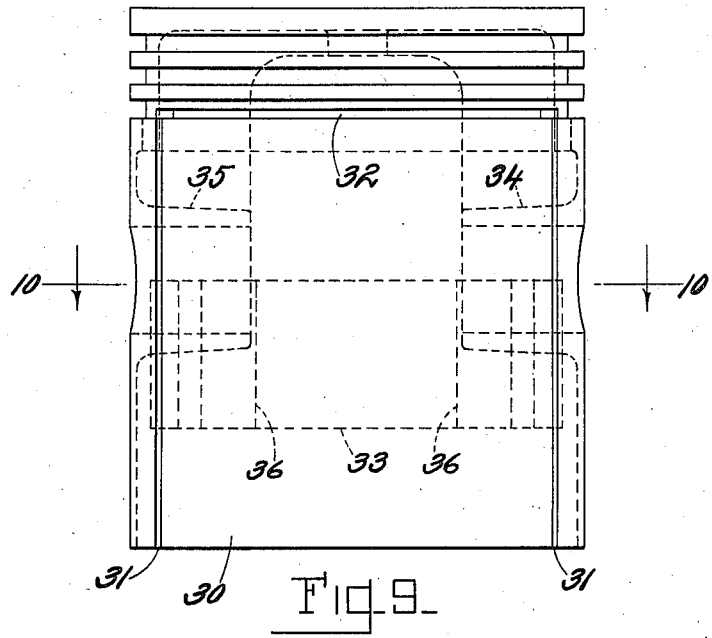
Fig. 9 is a side elevation of a piston similar to that shown in Figure 6 but having the independent portion of the skirt supported on horizontal ribs concentric with the skirt portion.
Figure 10:
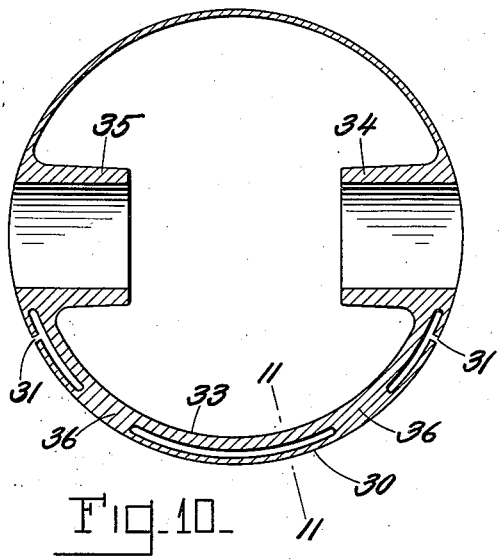
Fig. 10 is a horizontal section on line 10, 10 of Figure 9.
Figure 11:
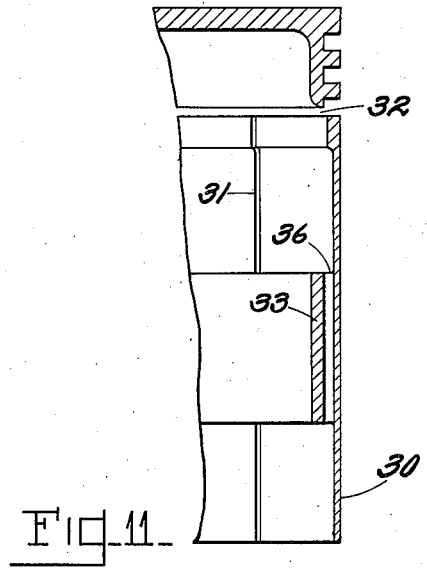
Fig. 11 is a vertical section on line 11, 11 of Figure 10.

Referring now to Figures 9, 10 and 11 there is shown therein a second modified form of my invention. In this type of piston, the head and one side of the skirt and bearings are of ordinary construction. At 30 is shown an independent portion of the skirt separated from the rest of the piston by vertical slots 31, 31, and a horizontal slot 32 formed at the back of the lowest piston ring groove. The independent skirt portion 30 is supported by a horizontal concentric rib 33 extending from one piston pin bearing 34 to the other piston pin bearing 35 and connected to the independent skirt portion at the points 36, 36. This piston is particularly adapted for use when it is desired to manufacture it by die-casting methods.

While I have described my invention as embodied in three different pistons, I do not limit myself to these particular forms, since it is capable of adaptation to varying conditions without departing from the spirit of the invention.

What I claim is—

1. A piston having a head, and a flexible rib suspended from the head and supporting a skirt extending upwardly therefrom and spaced from said head.

2. A piston having a head, a substantially circular rib having spaced connections with the head, and a skirt supported by and connected at a plurality of points to said rib and extending upward therefrom and spaced from the head.

3. A piston having a head, a skirt spaced from the head, and a relatively narrow substantially circular rib having spaced connections with said skirt and said head.

4. A piston having a head, piston pin bearings supported by the head, and a flexible rib connected with said bearings and supporting a skirt extending upwardly and spaced from said head.

5. A piston having a head, piston pin bearings supported by cross ribs extending downwardly from said head, and a flexible rib connected with said bearings and supporting a skirt extending upwardly and spaced from said head.

In testimony whereof I affix my signature.

GEORGE A. TAYLOR.